Oct. 12, 1926.  
R. H. O'BRIEN  
1,602,625  
CONSTRUCTION OF WHEELS MADE OF CAST STEEL OR ANY OTHER SUITABLE MATERIAL  
Filed Jan. 16, 1926
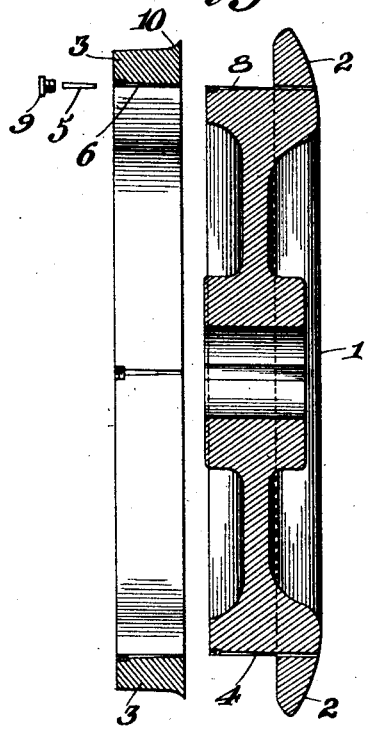
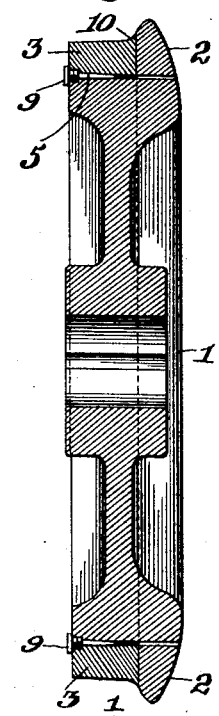
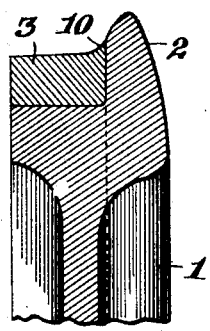
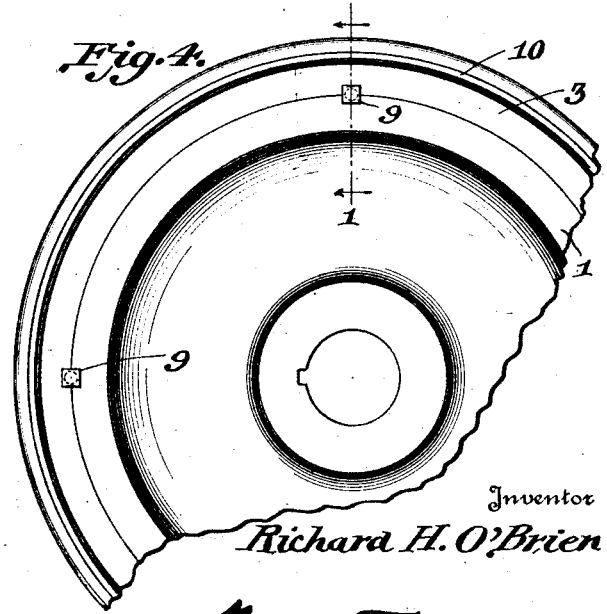
Inventor  
Richard H. O'Brien Patented Oct. 12, 1926.

1,602,625

UNITED STATES PATENT OFFICE.

RICHARD H. O'BRIEN, OF FOREST CITY, PENNSYLVANIA.

CONSTRUCTION OF WHEELS MADE OF CAST STEEL OR ANY OTHER SUITABLE MATERIAL.

Application filed January 16, 1926. Serial No. 81,739.

This invention relates to improvements in the construction of wheels made of cast steel or any other suitable material and adapted for use on cars common to coal mines or railroads, and the like.

An object of this invention is to provide means for preventing flange wear on the main body of the wheel, the wheels being of the type ordinarily supplied with demountable tread or rim portions, made of suitable material.

Other objects of this invention will appear from the following detailed description of the device, and as disclosed in the single sheet of drawings which is herewith made a part of this application.

In the drawings, Fig. 1 illustrates a vertical sectional view of the car wheel taken along line 1—1 of Fig. 4, the demountable rim being disclosed in detached relationship to the main body portion of the wheel.

Fig. 2 represents a vertical sectional view of the car wheel as disclosed in Fig. 1, with the demountable rim portion in assembled relationship to the main body portion of the wheel.

Fig. 3 illustrates a vertical sectional view of a portion of the car wheel.

Fig. 4 represents a side elevational view of the car wheel as disclosed in Fig. 2.

Numeral 1 designates the main body portion of the car wheel, constructed of any suitable material, such as cast steel, having flanged portions 2, integrally connected therewith along the inner peripheral edge of the wheel 1.

Numeral 3 designates a demountable rim portion constructed of cast steel or other suitable material and adapted to be shrunk on the main body portion of the wheel 1 or otherwise properly connected therewith as at 4. As an aid in maintaining the demountable rim in a set position on the main body portion of the car wheel 1, tapered pins 5 are adapted to be located in properly arranged grooves 6 and 8 in the demountable rim portions and the main body portions of the wheel, while the set screw 9 is adapted to hold in position the tapered pin 5. The demountable rim or tread portion 3 is preferably slightly inclined upwardly along its upper surface toward the flanged portion 2 of the main body portion of the wheel 1. The inclined surface of the demountable rim portion 3 together with a suitably turned up portion of the rim as at 10 will function as a protection to the flange portions 2 of the wheel.

In operation, the construction and adaptation of the demountable tread portion described and claimed herewith will function to efficiently protect the flange portion of the wheel, as the turned up portion 10 will obviously assume the wear due primarily to curves of the track. It is estimated that the useful life of a wheel may be extended 10 years or more by the use of the construction herein described and claimed. This invention provides a rim which may be easily removed after excessive wear, and replaced by a new tread or rim, thereby practically renewing the life of the wheel, as by this invention the flange portion 2 of the main wheel 1 will not have been worn to any appreciable extent; that is, the rim or tread portion as provided in this invention will function to receive practically all of the wear which is excessive and common to wheels of cars used in coal mines or otherwise.

The practice of electric car companies has been to dispense with used main body portions of the wheels owing to the fact that the integrally connected flange portions therewith have periodically received excessive wear, principally due to the curves in the tracks, and this invention provides an especially constructed demountable tread or rim portion that will effectively receive the wear commonly, at present, assumed by the wheel flange portions thereby providing an efficient means of extending the life of a car wheel.

What I claim is:—

In a car wheel having a flange, a removable tread member, a turned up portion along the upper inside edge of the tread adapted as a guard for the flange, and means for keying the tread member to the wheel, consisting of a pin and threaded retaining screw.

In testimony whereof I affix my signature.

RICHARD H. O'BRIEN.